United States Patent [19]

Beverwijk et al.

[11] Patent Number: 4,873,004
[45] Date of Patent: Oct. 10, 1989

[54] LUBRICATING COMPOSITION

[75] Inventors: Christiaan D. M. Beverwijk; Feike De Jong, both of Amsterdam, Netherlands; Peter Sant, Wirral, United Kingdom

[73] Assignee: Shell Oil Company, Houston, Tex.

[21] Appl. No.: 121,193

[22] Filed: Nov. 16, 1987

[30] Foreign Application Priority Data

Nov. 28, 1986 [GB] United Kingdom ................. 8628523

[51] Int. Cl.$^4$ ................. C10M 133/44; C10M 137/04
[52] U.S. Cl. ............................. 252/32.5; 252/32.7 E; 252/47.5; 252/49.6; 252/49.8; 252/51.5 A; 252/51.5 R
[58] Field of Search ................ 252/49.6, 51.5 A, 32.5, 252/32.7 E, 47.5, 49.8, 51.5 R

[56] References Cited

U.S. PATENT DOCUMENTS

| | | | |
|---|---|---|---|
| 3,172,892 | 3/1965 | Le Suer et al. | 260/326.5 |
| 3,254,025 | 5/1966 | Le Suer | 252/49.6 |
| 3,338,832 | 8/1967 | Le Suer | 252/49.6 |
| 4,374,033 | 2/1983 | Malec | 252/49.6 |
| 4,428,849 | 1/1984 | Wisotsky | 252/51.5 A |

FOREIGN PATENT DOCUMENTS

| | | |
|---|---|---|
| 949981 | 2/1964 | United Kingdom . |
| 1440219 | 6/1976 | United Kingdom . |
| 1483729 | 8/1977 | United Kingdom . |
| 1543627 | 4/1979 | United Kingdom . |
| 1565627 | 4/1980 | United Kingdom . |

Primary Examiner—Jacqueline V. Howard
Attorney, Agent, or Firm—Kimbley L. Muller

[57] ABSTRACT

A lubricating composition comprising a major portion of a lubricating oil and a minor portion of an alkyl or alkenyl-substituted succinimide, which succinimide is the reaction product of a polyamine with 3 to 25 carbon atoms, such has been selected from linear and branched alkylene polyamines, cycloaliphatic polyamines and heterocyclic polyamines, and an alkyl or alkenyl-substituted succinic anhydride, in which the alkyl or alkenyl moiety has a number average molecular weight from 600 to 1300 and in which the average number of succinic groups per alkyl or alkenyl group is between 1.4 and 4.0.

11 Claims, No Drawings

LUBRICATING COMPOSITION

The present invention relates to lubricating compositions comprising a major portion of a lubricating oil and a minor portion of an alkyl or alkenyl-substituted succinimide.

From U.S. Pat. No. 3,172,892 lubricating compositions are known which comprise a lubricating oil and, as an additive, the reaction product of an alkenyl-substituted succinic acid or anhydride with an ethylene polyamine. The alkenyl moiety in this product must have at least 50 carbon atoms. Although the description is silent on the ratio of the succinic acid to the alkenyl group, it is apparent from the examples that an equivalent ratio of less than 1 is employed. The additive of these known compositions is said to be an effective dispersant.

It has now been found that improved dispersancy properties are obtained with alkyl or alkenyl-substituted succinimides wherein the molecular weight of the alkyl or alkenyl moiety is within a certain range and the ratio between the succinic groups and the alkyl or alkenyl group shows an excess of succinic groups.

Accordingly, the present invention provides a lubricating composition comprising a major portion of a lubricating oil and a minor portion of an alkyl or alkenyl-substituted succinimide, whih succinimide is the reaction product of a polyamine with b 3 to 25 carbon atoms, which has been selected from linear and branched alkylene polyamines, cycloaliphatic polyamines and heterocyclic polyamines, and an alkyl or alkenyl-substituted succinic anhydride, in which the alkyl or alkenyl moiety has a number average molecular weight from 600 to 1,300 and in which the average number of succinic groups per alkyl or alkenyl group is between 1.4 and 4.0.

The lubricating oil used in the present compositions can be selected from natural, mineral, synthetic lubricating oils and mixtures thereof. The lubricating oils include and are preferably crankcase lubricating oils for spark-ignition and compression-ignition engines, but also hydraulic lubricants, metal-working fluids, automatic transmission fluids and the like are comprised by the definition of lubricating oil.

Natural lubricating oils include animal and vegetable oils, such as castor oil. Mineral oils comprise the lubricating oil fractions derived from crude oils, coal or shale, which fractions may have been subjected to certain treatments such as clay-, acid-, solvent- or hydrogenation treatmetns. Synthetic lubricating oils include synthetic polymers of hydrocarbons, modified alkylene oxide polymers, and ester lubricants, which are known in the art.

The alkyl or alkenyl substituent at the succinic group is preferably derived from a polyolefin. It is suitably derived from a homopolymer or copolymer of one or more olefin monomers having 2 to 16 carbon atoms, preferably from 2 to 6 carbon atoms. The copolymers include random, block and tapered copolymers. Suitable monomers include ethene, propene, butenes, isobutene, pentenes, octenes, and also diolefines such as butadiene and isoprene. If a diene is used as monomer the resulting polymer is preferably hydrogenated to saturate at least 90%, more preferably substantially all unsaturated bonds. It is especially preferred to use an alkenyl substituent derived form polyisobutylene.

As previously mentioned the average number molecular weight of the alkyl or alkenyl substituent should be between 600 to 1300. Molecular weight lower than 600 could incur solubility and volatility problems in some lubricating oils, whereas molecular weights above 1300 deteriorate the dispersancy properties of the resulting succinimides, especially in crankcase lubricants. To avoid any risk on the above problems the average number molecular weight is preferably from 750 to 1250. The number average molecular weight (Mn) can eaily be determined by vapor pressure osmometry or by gel permeation chromatography with calibration of the polymer, as will be appreciated by those skilled in the art. The weight average molecular weight (Mw) can also be determined by gel permeation chromatography. The quotient Mw/Mn, which is a measure indicating the width of molecular weight distribution, has usually a value from 1.5 to 4.0.

The average number of succinic groups per alkyl or alkenyl group is between 1.4 and 4.0. This means that at least one out of two alkyl or alkenyl moieties is connected to at least two succinic groups. Preferably, the average number of succinic groups per alkyl or alkenyl group is between 1.5 and 3.0.

The preparation of alkenyl-substituted succinic anhydride is done in analogy to processes known in the art. To obtain the precursors of the succinimides used in the present invention one uses starting material with the required molecular weight and one uses an appropriate amount of the succinic anhydride precursor, i.e. generally maleic anhydride. In case a polyolefin is used as substituent substituted succinic anhydride can conveniently be prepared by mixing the polyolefin, e.g. polyisobutylene, with maleic anhydride and passing chlorine through the mixture yielding hydrochloric acid and alkenyl-substituted succinic anhydride, as described in e.g. GB-A-949,981.

Another method for the preparation of substituted succinic anhydride is described in the above-mentioned U.S. Pat. No. 3,172,892, according to which a halogenated, in particular chlorinated, polyolefin is reacted with maleic anhydride.

From e.g. NL-A-74 12 057 it is known to prepare hydrocarbon-substituted succinic anhydride by reacting thermally a polyolefin with maleic anhydride. It is further possible to combine the methods of this Dutch application and GB-A-949,981, as is illustrated in GB-A-1,440,219 and GB-A-1,543,627. The products prepared in this way include compounds in which the alkenyl chain is connected to one or both of the alpha carbon atoms of the succinic group.

Suitable linear polyamines used in the reaction product of the present invention include the ethylene polyamines, but also α,ω-diaminopropane or butane, propylene polyamines, di(trimethylene)triamine, and butylene polyamines. Preferred are the ethylene polyamines, in particular diethylene triamine, triethylene tetramine, tetraethylene pentamine and pentaethylene hexamine.

Suitable branched polyamines include those of formula I

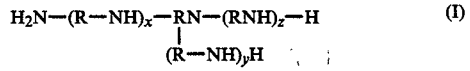

in which R is a $C_{2-4}$ alkylene group, x is 0–7, y is 1–7, z is 0–7 and x+y+z is 1–8.

Cycloaliphatic polyamines are suitable selected from 5 or 6-membered ring systems, such as cyclopentane or cyclohexane rings. Amino groups may be attached directly to the rings. However, it is also possible that the rings are substituted by amino alkyl groups. A suitable cyclic polyamine is 1,4-diaminocyclohexane. Among suitable heterocyclic polyamines are tetra- and dihydro pyridines, piperadines, azetidines, pyrroles, piperazines, substituted by one or more amino, amino alkyl groups of formula II

in which w is from 0-5 and R is a $C_{2-4}$ alkylene group. Especially preferred are N-(2-aminoethyl)piperazine and 1,4-bis(2-aminoethyl)piperazine.

Ethylene polyamines as mentioned under the linear polyamines are especially very useful in the present invention. Such compounds are prepared very conveniently by reacting an alkylene chloride with ammonia or by reacting ethylene imine with e.g. ammonia. These reactions result in a mixture of alkylene polyamines, including cyclic products such as piperazines.

The polyamines have advantageously a molecular structure consisting of $[N(R_2)—R_1]_a$ and/or

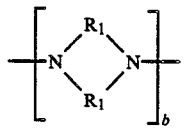

as the building blocks and of $—R_1—NR_2R_3$ and/or

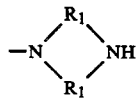

as the chain terminating groups, wherein $R_1$ is ethylene, propylene, trimethylene or a butylene group, $R_2$ and $R_3$ are hydrogen or $—R_1—NH_2$, a is 0 to 7 and b is 1 to 3.

The reaction products of the alkenyl-substituted succinic anhydride and the polyamine are obtained by heating them together, preferably at temperatures of at least 80° C., e.g. from 100° to 300° C. Most preferred are temperatures of 125° to 250° C. It is preferred that the number of succinic anhydride groups per polyamine group is greater than 1, so that two primary-amine groups of at least some of the polyamines can react with a succinic anhydride group to yield a mixture of mono- and bis-succinimides. When the equivalent ratio of succinic anhydride groups and polyamine group equals two, the reaction product will consist on average of bis-succinimides. When polyamines with two primary amine groups are used, such as linear ethylene polyamines use of more succinic group may result in a reaction product which contains unreacted succinic anhydride groups or amido groups. The lubricating composition according to the present invention preferably contains succinimide additives which are the reaction product of 1.4 to 2.2 groups of succinic anhydride groups per polyamine group.

It is also possible to subject the alkenyl-substituted succinimide to post-treatments. The invention therefore further provides lubricating composition comprising a major portion of a lubricating oil and a minor portion of an additive obtained by post-treating an alkenyl-substituted succinimide as described above, which post-treating has been carried out by an agent selected from boron oxide, boron oxide hydrate, boron halides, boron acids, esters of boron acids, carbon disulfide, $H_2S$, sulfur, sulfur chlorides, alkenyl cyanides, carboxylic acid acylating agents, aldehydes, ketones, urea, thiourea, guanidine, dicyanodimide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols.

These post-treatments are known in the art, and hence a detailed write-up of these processes is unnecessary.

The lubricating composition according to the present invention preferably contains from 0.1 to 10%w of the succinimide, based on the total composition, more preferably from 0.5 to 5% w. The composition may contain various other additives, known in the art, such as viscosity index improvers, e.g. linear or star-shaped polymers of a diene such as isoprene or butadiene, or a copolymer of such a diene with optionally substituted styrene. These copolymers are preferably block copolymers and are preferably hydrogenated to such an extent that most of the olefinic unsaturation is saturated. Other suitable additives include extreme pressure/anti-wear additives such as zinc or sodium dithiophosphates, antioxidants, friction modifiers or metal-containing detergents such as phenates, sulphonates, alkylsalicylates or naphthenates, all of which detergents may be overbased.

The lubricating composition according to the invention has excellent dispersancy properties.

The lubricating composition according to the present invention is suitably prepared by addition of an additives concentrate to a lubricating base oil. Such a concentrate generally comprises a lubricating oil as solvent/diluent and one or more additives in a concentrated form. Hence, the present invention further provides a lubricating oil concentrate comprising a lubricating oil and from 10 to 80% w of an alkyl or alkenyl-substituted succinimide as described above, optionally after a post-treatment as indicated supra, based on the total concentrate.

The succinimides as described above are novel compounds. Hence, the present invention provides an alkyl or alkenyl-substituted succinimide which is the reaction product of a polyamine with 3 to 25 carbon atoms which has been selected from linear and branched polyamines, cycloaliphatic polyamines and heterocyclic polyamines, and an alkyl or alkenyl-substituted succnic anhydride, in which the alkyl or alkenyl moiety has a number average molecular weight from 600 to 1300 and in which the average number of succinic groups per alkyl or alkenyl group is between 1.4 and 4.0. Preferred embodiments of these compounds are described above.

It is submitted that these succinimides can also be used in fuels such as gasoline, kerosine and fuel oils.

The invention further provides a process for the preparation of such an alkyl or alkenyl-substituted succinimide in which an alkene or a halogenated alkene, optionally in the presence of chlorine, is contacted with maleic acid or anhydride at a temperature of 140° to 220° C., whereby the alkene has a number average molecular wieght of 600 to 1300 and whereby the molar amount of maleic anhydride per equivalent alkene is from 1.5 to 4.5, preferably from 1.8 to 4.0, and subsequently reacting the product obtained with a polyamine with 3 to 25 carbon atoms, which has been selected from linear and branched alkylene polyamines, cycloaliphatic polyamines and heterocyclic polyamines.

When an alkene and maleic anhydride are contacted in the presence of chlorine, the amount of chlorine is suitably such that the molar ratio of $Cl_2$/alkene is at least two, preferably from 2 to 3.

The molar amount of maleic anhydride groups per equivalent of polyamine is preferably greater than 1. The reaction temperature in the preparation of the imide from the anhydride and the polyamine is advantageously from 20° to 250° C. Preferred reaction conditions of this process are described above or in one of the references mentioned earlier.

The invention will further be understood from the following Examples.

EXAMPLE 1: Preparation of alkenyl-substituted anhydride Experiment 1

A mixture of 143 pbw polyisobutylene (PIB) (Mn is 950) and 32 pbw of maleic anhydride (MALA), yielding a molar ratio of maleic anhydride to polyisobutylene of 2.1, was heated to 180° C. Chlorine (29 pbw, molar ratio of chlorine to polyisobutylene of 2.7) was introduced into the mixture during a period of five hours. The mixture was then heated to 200° C. for another two hours. The excess maleic anhydride was removed by evaporation under reduced pressure yielding a product with acid number of 170 mg KOH/g, corresponding to a ratio of succinic anhydride groups per equivalent polyisobutenyl group (SUC/PIB) of 1.8.

Similar procedures were used with different molecular weight polyisobutene and different reactant ratios. The different ratios of the reactants and some properties of the resulting products are indicated in Table 1.

TABLE 1

| Exp. No. | Reactants | | | Product | |
|---|---|---|---|---|---|
| | PIB Mn | Molar MALA/PIB | Ratio $Cl_2$/PIB | Molar Ratio SUC/PIB | Acid Number |
| 2 | 950 | 2.1 | 2.7 | 1.8 | 170 |
| 3 | 950 | 1.3 | 1.1 | 1.0 | 90 |
| 4 | 950 | 1.3 | 1.1 | 1.0 | 90 |
| 5 | 1900 | 2.1 | 2.7 | 1.8 | 90 |
| 6 | 1800 | 2.2 | 2.7 | 1.8 | 85 |

EXAMPLE 2: Preparation of succinimides

The products of experiments 1 to 6 were reacted with tetraethylene pentamine (TEPA) by adding the amine to a 1:1 mixture of these succinic anhydride (SUC) products and a mineral oil at 180° C. After reaction for about three hours the products obtained were purified by filtration. The relative amounts of the reactants and some physical properties of the resulting product are indicated in Table 2.

TABLE 2

| Exp. No. | Prod. Of Exp. No. | Reactants Molar Ratio SUC/TEPA | Product | |
|---|---|---|---|---|
| | | | Molar Ratio SUC/TEPA | Nitrogen Content, % w |
| 7 | 1 | 1.5 | 1.50 | 5.9 |
| 8 | 2 | 2.2 | 2.00 | 4.5 |
| 9 | 3 | 1.5 | 1.45 | 3.6 |
| 10 | 4 | 2.0 | 1.95 | 2.9 |

TABLE 2-continued

| Exp. No. | Prod. Of Exp. No. | Reactants Molar Ratio SUC/TEPA | Product | |
|---|---|---|---|---|
| | | | Molar Ratio SUC/TEPA | Nitrogen Content, % w |
| 11 | 5 | 1.5 | 1.70 | 3.2 |
| 12 | 6 | 2.1 | 2.00 | 2.6 |

It is observed that experiments 7 and 8 yield compounds according to the invention. The other four compounds have been included for comparison purposes.

EXAMPLE 3: Carbon black dispersancy test

In the carbon black dispersancy test 3%w of carbon black is added to a lubricating oil formulation and the increase in kinematic viscosity at 60° C. is determined, using an Ubbelohde viscometer. A large increase denotes a poor performance. It appears that the outcome of the relatively simple test correlates excellently with the ranking in dispersancy behavior in diesel engine crank case lubricating oils. The test is described in British Rail publication BR 669:1984.

The formulation used was a SAE I5W40 Middle East lubricating oil which contained a commercial package of a zinc dialkyldithophosphate, an overbased calcium alkylsalicylate and VI improver. To this formulation was added 1%w/w of a succinimide prepared in any of experiment 7-12. The resulting compositions were subjected to the carbon black dispersancy test. The test results are reproduced in Table 3.

TABLE 3

| Compound No. | Increase in Viscosity, mm$^2$/s |
|---|---|
| 7 | 16.6 |
| 8 | 18.6 |
| 9 | 29.4 |
| 10 | 29.6 |
| 11 | 20.6 |
| 12 | 20.2 |

From the above results it is apparent that compounds of Experiments 7 and 8 have the best dispersancy properties.

EXAMPLE 4: Sequence VD test

For the compounds of experiments 8, 10 and 12 the dispersancy behavior in the Sequence VD test was determined. This test is a gasoline engine test determining the sludge and varnish formation. The tests were carried out in accordance with the ASTM specifications as described in ASTM Special Technical Paper, 315H, part III (Dec. 1981), and the average engine sludge and average engine varnish were determined. The lubricating compositions comprised in a 10W40 Middle East lubricating base oil with a commercial VI-improver, to which 2.5%w/w of one of the above succinimides was added. The results of the tests are indicated in Table 4 (The value 10 means no sludge or varnish at all).

TABLE 4

| Compound of Exp. No. | Average Sludge | Average Varnish |
|---|---|---|
| — | 8.6 | 4.5 |
| 8 | 9.4 | 8.3 |
| 10 | 9.5 | 6.7 |
| 12 | 9.5 | 8.0 |

From the above results it is apparent that all succinimides have a beneficial effect, compound 8 being equally good in the sludge protection and best in protection against varnish formation.

We claim as our invention:

1. A lubricating composition comprising a major portion of a lubricating oil and a minor portion of an alkyl or alkenyl-substituted succinimide, wherein said succinimide is formed from the reaction product of:
   (1) a polyamine possessing 3 to 25 carbon atoms, said polyamines being selected from linear alkylene polyamines, branched alkylene polyamines, cycloaliphatic polyamines and heterocyclic polyamines, and
   (2) an alkyl or alkenyl-substituted succinic anhydride, wherein the alkyl or alkenyl moiety of said anhydride has a number average molecular weight from 600 to 1300 and where the average number of succinic groups per alkyl or alkenyl groups is between 1.4 and 4.0.

2. The lubricating composition according to claim 1, in which the alkyl or alkenyl moiety of said anhydride is derived from the polymerization product of $C_{1-6}$ olefins.

3. The lubricating composition according to claim 2, in which the alkyl or alkenyl moiety is derived from polyisobutylene.

4. The lubricating composition according to claim 1 wherein the average number of succinic groups per alkyl or alkenyl group is between 1.5 and 3.0.

5. The lubricating composition according to claim 1 wherein the polyamine is selected from the group consisting of diethylene triamine, triethylene tetramine, tetraethylene pentamine and pentaethylene hexamine.

6. The lubricating composition according to claim 1 wherein the equivalent ratio of succinic anhydride groups and polyamine group is greater than 1.

7. The lubricating composition according to claim 6 wherein the number of succinic groups per polyamine group is between 1.4 and 2.2.

8. The lubricating composition according to claim 1 wherein said minor amount of additive is treated with an agent selected from boron oxide, boron oxide hydrate, boron halides, boron acids, esters of boron acids, carbon disulfide, $H_2S$, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde, formaldehyde-producing compounds, and phenols.

9. The lubricating composition according to claim 1 wherein said amount of the alkyl or alkenyl-substituted succinimide is between 0.1 and 10%w based on the total composition.

10. A lubricating oil concentrate comprising from 10 to 80%w of an alkyl or alkenyl-substituted succinimide, wherein said succinimide is formed from the reaction product of:
    (1) a polyamine possessing 3 to 25 carbon atoms, said polyamines being selected from linear alkylene polyamines, branched alkylene polyamines, cycloaliphatic polyamines and heterocyclic polyamines, and
    (2) an alkyl or alkenyl-substituted succinic anhydride, wherein the alkyl or alkenyl moiety of said anhydride has a number average molecular weight from 600 to 1300 and where the average number of succinic groups per alkyl or alkenyl groups is between 1.4 and 4.0.

11. An alkyl or alkenyl-substituted succinimide prepared by the reaction of a polyamine having 3 to 25 carbon atoms, said polyamine being selected from linear and branched alkylene polyamines, cycloaliphatic polyamines and heterocyclic polyamines, and an alkyl or alkenyl-substituted succinic anhydride, wherein the alkyl or alkenyl moiety has a number average molecular weight from 600 to 1300 and in which the average number of succinic groups per alkenyl group is between 1.4 and 4.0.

* * * * *